United States Patent
Alber

(10) Patent No.: US 9,676,488 B2
(45) Date of Patent: Jun. 13, 2017

(54) DUAL DISSIMILAR ENGINES FOR AN AIRCRAFT

(71) Applicant: Sikorsky Aircraft Corporation, Stratford, CT (US)

(72) Inventor: Mark R. Alber, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 199 days.

(21) Appl. No.: 14/734,505

(22) Filed: Jun. 9, 2015

(65) Prior Publication Data

US 2016/0046382 A1 Feb. 18, 2016

Related U.S. Application Data

(60) Provisional application No. 62/010,182, filed on Jun. 10, 2014.

(51) Int. Cl.
| | |
|---|---|
| *B64D 31/06* | (2006.01) |
| *B64D 27/02* | (2006.01) |
| *B64C 29/02* | (2006.01) |
| *B64D 31/12* | (2006.01) |
| *B64D 35/04* | (2006.01) |

(52) U.S. Cl.
CPC .............. *B64D 27/02* (2013.01); *B64C 29/02* (2013.01); *B64D 31/12* (2013.01); *B64D 35/04* (2013.01)

(58) Field of Classification Search
CPC .......... B64D 31/06; B64D 27/02; B64C 29/02
USPC .................................................. 701/3
See application file for complete search history.

(56) References Cited

U.S. PATENT DOCUMENTS

| | | | |
|---|---|---|---|
| 2,689,013 A | 9/1954 | Dean et al. | |
| 8,561,744 B1 | 10/2013 | Belloso | |
| 8,996,206 B2 * | 3/2015 | Evrard | B64D 31/06 701/15 |
| 2007/0034738 A1 * | 2/2007 | Sanders | B64C 27/12 244/23 A |
| 2013/0184903 A1 * | 7/2013 | Evrard | B64D 31/06 701/15 |

OTHER PUBLICATIONS

Twin Commander LLC, "Twin Commander Performance, Jetprop Commander vs. Competing Aircraft", http://www.twincommander.com/performance.html, Nov. 25, 2013, 2 pages.

* cited by examiner

*Primary Examiner* — Anne M Antonucci
(74) *Attorney, Agent, or Firm* — Cantor Colburn LLP

(57) ABSTRACT

A system and method for controlling a tail-sitter aircraft, includes determining a mode of operation for the aircraft; operating each of a large turbine engine and a small turbine engine to provide total aircraft power during hover or high-power mode of operation; and selectively providing aircraft power from the small turbine engine to a plurality of rotors during a long-range endurance cruise mode of operation.

14 Claims, 3 Drawing Sheets

DUAL DISSIMILAR ENGINES FOR AN AIRCRAFT

CROSS-REFERENCE TO RELATED APPLICATIONS

This application claims the benefit of U.S. provisional patent application Ser. No. 62/010,182, filed Jun. 10, 2014, the entire contents of which are incorporated herein by reference.

FIELD OF THE INVENTION

The subject matter disclosed herein relates generally to the field of rotorcraft, and to a vertical take-off and landing aircraft with dual and dissimilar engines that maximizes performance during hover and long endurance cruise.

DESCRIPTION OF RELATED ART

Typically, a vertical take-off and landing (VTOL) aircraft, e.g., a helicopter, tiltrotor, tiltwing, or a tail-sitter aircraft, can be airborne from a relatively confined space. Unmanned aerial vehicles (UAV's), for example, fixed-wing, and rotorcraft UAV's, are powered aircraft without a human operator. Autonomous UAV's are a natural extension of UAV's and do not require real-time control by a human operator and may be required to operate over long distances during search and/or rescue operations or during intelligence, surveillance, and reconnaissance ("ISR") operations. A UAV tail-sitter aircraft has a fuselage that is vertically disposed during take-off and hover and must transition from a vertical flight state (i.e., rotor borne) to a horizontal flight-state (i.e., wing borne). However, during take-off or hover, the VTOL aircraft requires more power from the engines than is required during long-range cruise (i.e., wing borne flight). Aircraft power is provided by two identical engines. During take-off or hover, the two engines operate at maximum power. However, operating both engines during cruise can negatively impact desirable endurance for the aircraft during ISR operations. A tail-sitter VTOL aircraft that can provide desirable endurance through efficient operation of turbine engines is desired.

BRIEF SUMMARY

According to an aspect of the invention, a method for controlling a tail-sitter aircraft, includes determining, with a processor, a mode of operation for the aircraft; operating, with the processor, each of a large turbine engine and a small turbine engine to provide total aircraft power during hover or high-power mode of operation; and selectively providing, with the processor, aircraft power from the small turbine engine to a plurality of rotors during a long endurance cruise mode of operation.

In addition to one or more of the features described above, or as an alternative, further embodiments could include mechanically connecting a cross-shaft to each of a large gearbox of a first rotor and a small gearbox of a second rotor, the first and second rotors being associated with the plurality of rotors.

In addition to one or more of the features described above, or as an alternative, further embodiments could include delivering aircraft power from the large turbine engine to the small gearbox during the hover or the high-power mode of operation.

In addition to one or more of the features described above, or as an alternative, further embodiments could include delivering aircraft power from the small turbine engine to the large gearbox during the long endurance cruise mode of operation.

In addition to one or more of the features described above, or as an alternative, further embodiments could include shutting down the large turbine engine during the long endurance cruise mode of operation.

In addition to one or more of the features described above, or as an alternative, further embodiments could include coupling a plurality of rotor blades to the plurality of rotors.

In addition to one or more of the features described above, or as an alternative, further embodiments could include providing reduced aircraft power to each of the plurality of rotors in the long endurance cruise mode of operation.

According to another aspect of the invention, a system for controlling a tail-sitter aircraft with a fuselage having a plurality of rotors; a large turbine engine associated with a first rotor of the plurality of rotors; a small turbine engine associated with a second rotor of the plurality of rotors; a processor; and memory having instructions stored thereon that, when executed by the processor, cause the system to: determine a mode of operation for the aircraft; operate each of the large turbine engine and the small turbine engine to provide total aircraft power during hover or high-power mode of operation; and selectively provide power from the small turbine engine to the plurality of rotors during a long endurance cruise mode of operation.

In addition to one or more of the features described above, or as an alternative, further embodiments could include a cross-shaft that mechanically connects a large gearbox of the first rotor to a small gearbox of the second rotor.

In addition to one or more of the features described above, or as an alternative, further embodiments could include a large turbine engine that is configured to deliver aircraft power to the small gearbox during the hover or the high-power mode of operation.

In addition to one or more of the features described above, or as an alternative, further embodiments could include a small turbine engine that is configured to deliver aircraft power to the large gearbox during the long endurance cruise mode of operation.

In addition to one or more of the features described above, or as an alternative, further embodiments could include a processor that is configured to shut down the large turbine engine during the long endurance cruise mode of operation.

In addition to one or more of the features described above, or as an alternative, further embodiments could include a plurality of rotor blades coupled to the plurality of rotors.

In addition to one or more of the features described above, or as an alternative, further embodiments could include a processor that is configured to provide reduced aircraft power to each of the plurality of rotors in the long endurance cruise mode of operation.

Technical effects of a VTOL tail-sitter aircraft with dual dissimilarly sized turbine engines solves the problem of prior art dual engine aircraft with same sized engines by providing aircraft power required for take-off, hover, and high-power cruise speeds, and reduced fuel consumption during long endurance mode of operation by operating the turbine engines in a single engine configuration.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Figure 1A:
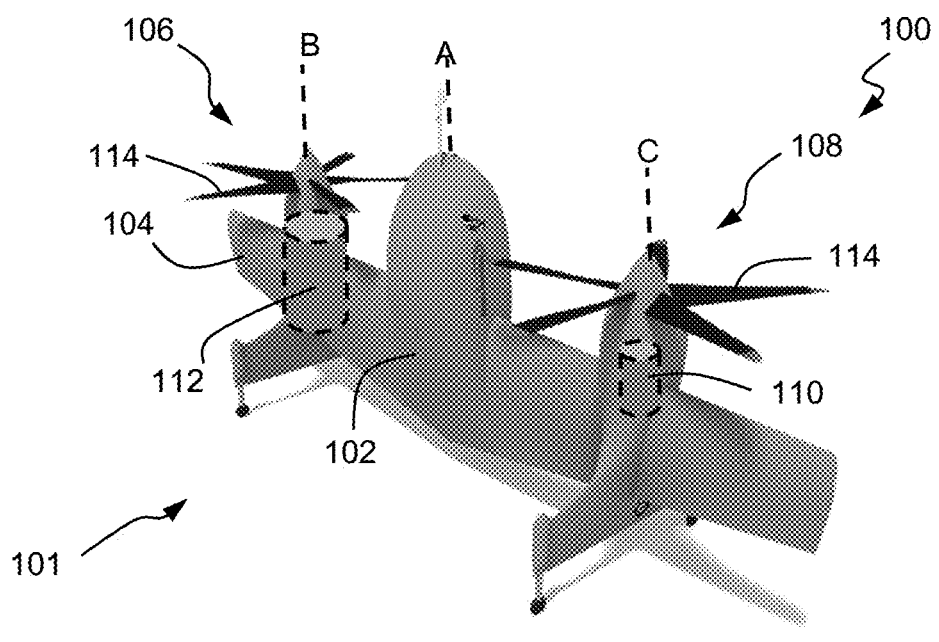
FIG. 1A is a perspective view of an exemplary aircraft during take-off in accordance with an embodiment of the invention.
Figure 1B:
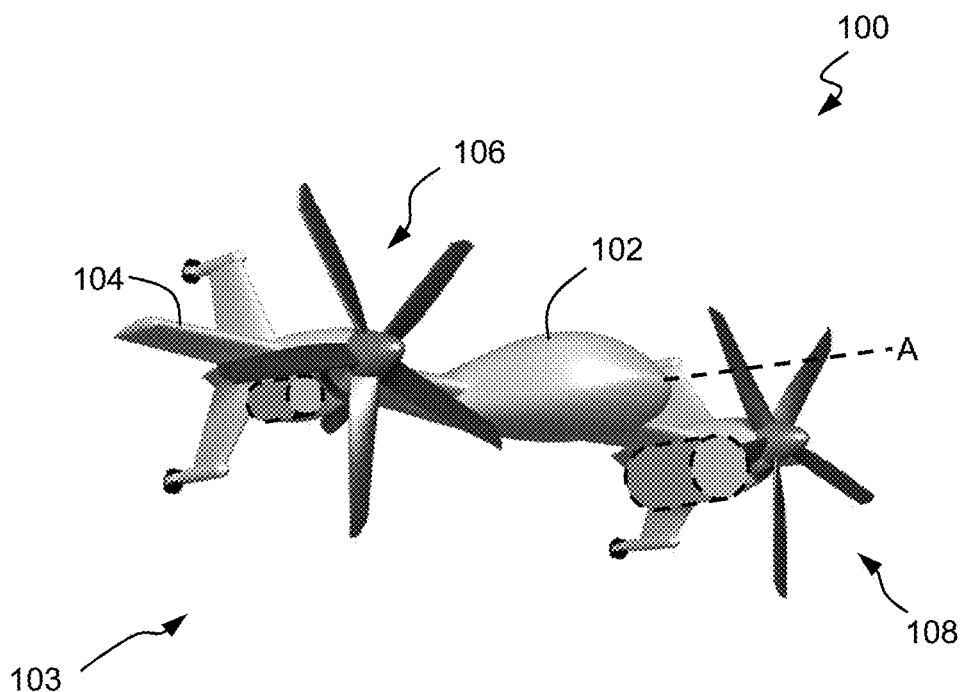
FIG. 1B is a perspective view of the aircraft of FIG. 1A that is shown during horizontal flight in accordance with an embodiment of the invention.
Figure 1C:
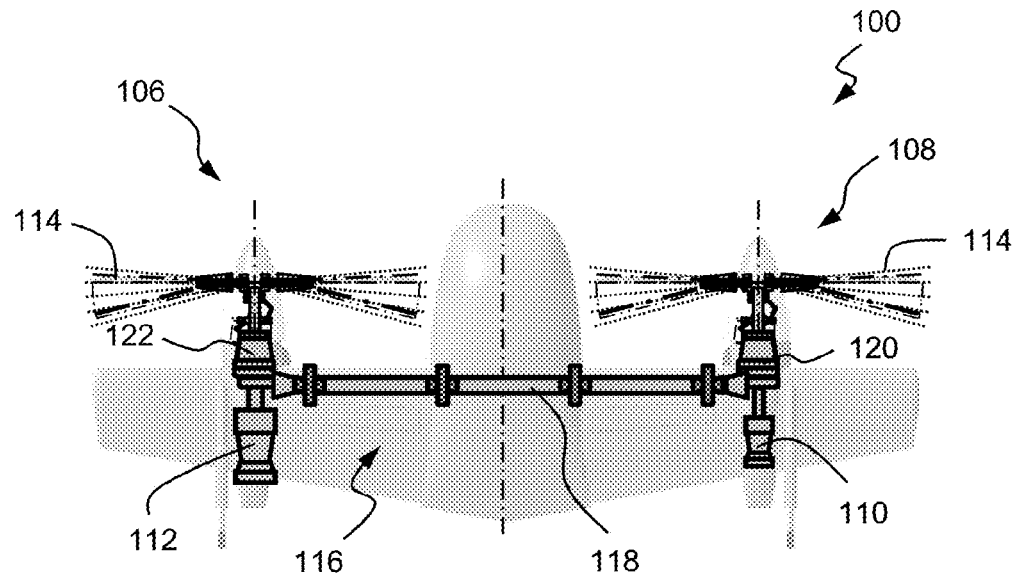
FIG. 1C is a partial elevation view of the aircraft of FIG. 1A but is shown with dual dissimilar engines in accordance with an embodiment of the invention.

Referring now to the drawings, FIGS. 1A, 1B, and 1C illustrate several views of an exemplary VTOL vehicle in the form of a tail-sitter aircraft 100 for providing high speed, and endurance flight in accordance with embodiments of the invention. As illustrated, tail-sitter aircraft 100 includes a fuselage 102, an elongated wing structure 104, and a plurality of rotors 106 and 108. Each rotor 106 and 108 includes a different sized engine that provides aircraft power during hover, high speed-cruise, and long endurance cruise for endurance operations. Although a particular configuration of a tail-sitter aircraft 100 is illustrated and described in the disclosed embodiments, it will be appreciated that other VTOL configurations of aircraft having dual and dissimilar sized engines including fixed-wing aircraft, tiltrotor aircraft, rotary-wing aircraft, and tail-sitting VTOL aircraft including micro air- or organic air-vehicles may also benefit from embodiments disclosed.

As illustrated in FIG. 1A, the exemplary tail-sitter aircraft 100 is shown during hover (i.e., rotor-borne flight state 101) whereby longitudinal axis A of fuselage 102 is oriented in a vertical direction with respect to the ground plane. Fuselage 102 is generally located in the middle of wing structure 104, which is generally orthogonal to longitudinal axis A of fuselage 102 and substantially parallel to the ground plane. A plurality of rotors 106 and 108 are mounted to wing structure 104 along respective axes B and C. Axes B, C are generally parallel to axis A. Each rotor 106 and 108 includes an internal combustion or turbine engine 110 and 112 (shown in phantom), respectively, to provide specific fuel consumption ("full") rated aircraft power to rotors 106 and 108. Turbine engines 110 and 112 are dissimilarly-sized turbine engines that are configured for control by a flight computer in order to provide maximum power during take-off and hover and reduced power for endurance flight, as will be described below in reference to FIGS. 3A and 3B. As illustrated in FIG. 1A, engine 112 is larger than engine 110 and both engines can cooperatively provide 100 percent aircraft power required for hover and forward flight. Alternatively, engine 112 can be larger than engine 110 in accordance with an embodiment of the invention. For ease of understanding, engines 110 and 112 will be referred to as small engine 110 and large engine 112. Each rotor 106 and 108 includes substantially similar rotor blades 110 that provide thrust during take-off and hover (i.e., rotor borne flight state 101) and during cruise (i.e., wing borne flight).

FIG. 1B depicts tail-sitter aircraft 100 during a cruise 103 (i.e., wing-borne flight) whereby wing structure 104 and fuselage 102 can be substantially parallel to the ground plane. During cruise 103, wing structure 104 is configured to provide lift while one or more turbine engines 110 and 112 provide thrust to rotors 106 and 108 during one or more operating modes of aircraft 100, as will be described below in reference to FIGS. 3A and 3B.

FIG. 1C illustrates an exemplary drive system 116 for tail sitter aircraft 100 in accordance with an embodiment of the invention. Drive system 116 includes a cross-shaft 118 that distributes power from turbine engines 110 and 112 to rotors 106 and 108. Turbine engines 110 and 112 are coupled to their associated gearboxes 120 and 122. The gearboxes 120 and 122 receive shaft power from the turbines engines 110 and 112 in order to drive rotor blades 114 in order to provide thrust to tail sitter aircraft 100. Each gearbox 120 and 122 can include free-wheel clutches, and linkages connecting gearboxes 120 and 122 to cross-shaft 118, but these are not shown for clarity.

Figure 2:
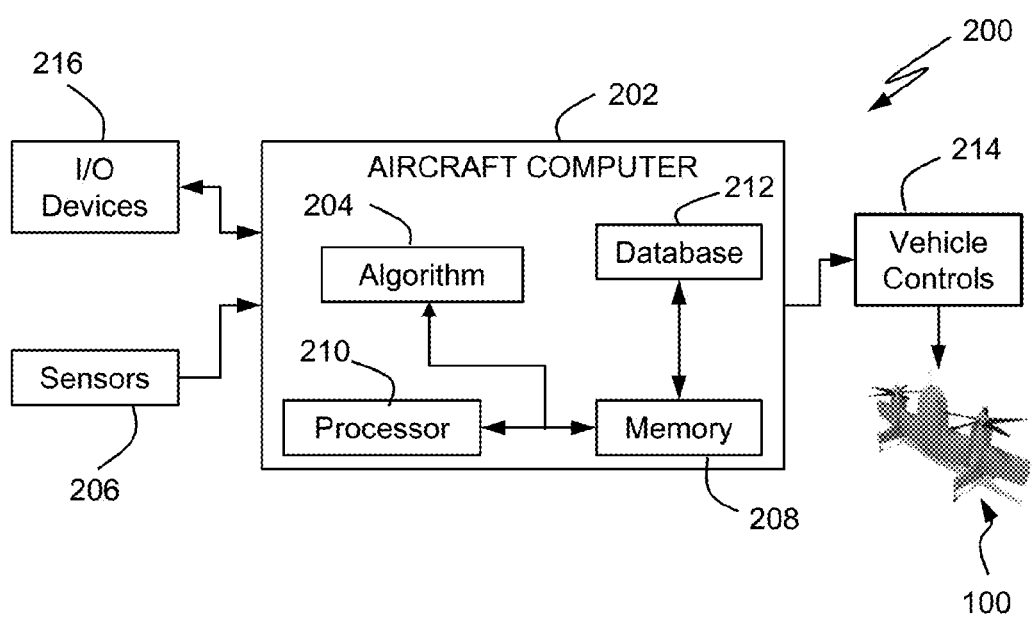
FIG. 2 is a schematic view of an exemplary computing system in accordance with an embodiment of the invention.

FIG. 2 illustrates a schematic block diagram of a system 200 on board tail-sitter aircraft 100 according to an exemplary embodiment. As illustrated, the system 200 includes aircraft computer 202 that executes instructions for implementing an algorithm 204 for selectively distributing power from turbine engines 110 and 112 (FIGS. 1A-1C) to rotor blades 114 of rotors 106 and 108 during flight. In an embodiment, aircraft computer 202 can determine an operating mode for tail-sitter aircraft 100 and provide full rated aircraft power from each of the large turbine engine and the small turbine engine to provide total aircraft power during hover or high-power cruise mode of operation, and selectively provide power from the small turbine engine to the plurality of rotors during a long-endurance cruise mode of operation. Aircraft computer 202 may receive real-time information acquired from sensors 206, e.g., accelerometers, Light Detection And Ranging ("LIDAR"), or weight-on-wheels in order to implement algorithm 204. Computer 202 includes a memory 208 that communicates with a processor 210. Memory 208 may store algorithm 204 as executable instructions that are executed by processor 210. The instructions may be stored or organized in any manner and at any level of abstraction, such as in connection with the execution of the algorithm 204. Processor 210 may be any type of processor (such as a central processing unit ("CPU") or a graphics processing unit ("GPU")), including a general purpose processor, a digital signal processor, a microcontroller, an application specific integrated circuit ("ASIC"), a field programmable gate array ("FPGA"), or the like. Also, in embodiments, memory 208 may include random access memory ("RAM"), read only memory ("ROM"), or other electronic, optical, magnetic, or any other computer readable medium onto which is stored algorithm 204.

System 200 may include a database 212. Database 212 may be used to store information on which tail-sitter aircraft 100 operates. Tail-sitter aircraft 100 may also operate on real-time data acquired by sensors 206 or other terrain and obstacle perception sensors. Also, sensor data acquired by sensors 206 may be stored in database 212. The data stored in database 212 may be based on one or more other algorithms or processes for implementing algorithm 204. For example, in some embodiments data stored in database 212 may be a result of processor 210 having subjected data received from sensors 206 to one or more filtration processes. Database 212 may be used for any number of reasons. For example, database 212 may be used to temporarily or permanently store data, to provide a record or log of the data stored therein for subsequent examination or analysis, etc. In some embodiments, database 212 may store a relationship between data, such as one or more links between data or sets of data acquired on board tail-sitter aircraft 100.

System 100 may provide one or more controls, such as vehicle controls 214. Vehicle controls 214 may provide directives based on, e.g., flight configurations. Directives provided by vehicle controls 214 may include navigating tail-sitter aircraft 100 including shutting down turbine engine 112 and/or distributing power from turbine engine 110 (FIGS. 1A-1C). The directives may be presented on one or more input/output ("I/O") devices 216. I/O devices 216 may include a display device or screen, audio speakers, a graphical user interface (GUI), etc. In some embodiments, I/O devices 216 may be used to enter or adjust a linking between data or sets of data. It is to be appreciated that system 200 is illustrative. In some embodiments, additional components or entities not shown in FIG. 2 may be included. In some embodiments, one or more of the components or entities may be optional. In some embodiments, the components or entities of system 200 may be arranged or configured differently from what is shown in FIG. 2. For example, in some embodiments I/O device(s) 216 may be commanded by vehicle controls 214, as opposed to being commanded by processor 214 as shown in FIG. 2.

Figure 3A:
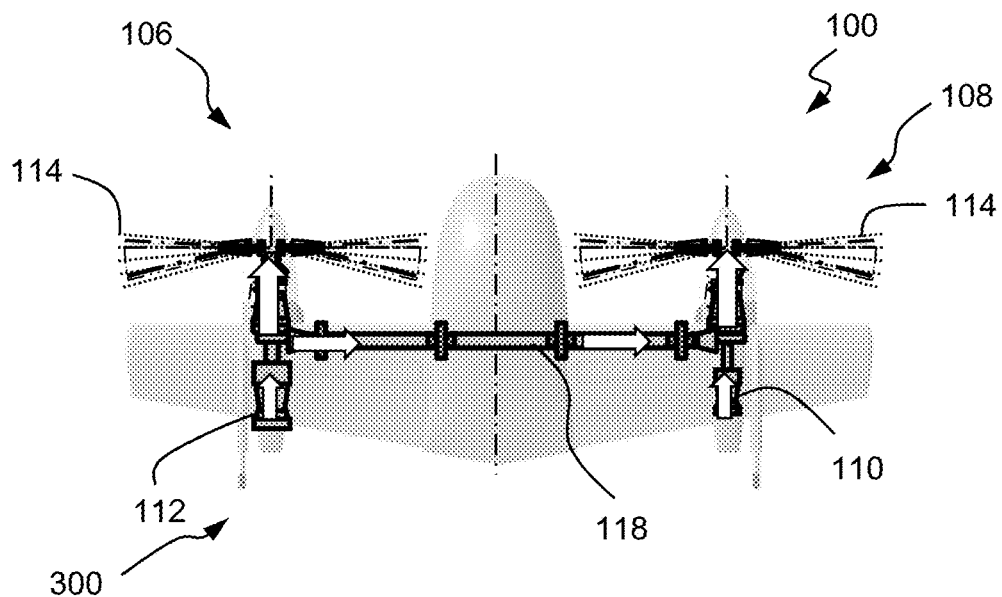
FIG. 3A is a partial elevation view an aircraft that is shown during hover and high-power cruise operating mode in accordance with an embodiment of the invention.

FIGS. 3A and 3C illustrate views of turbine engine configurations for tail-sitter aircraft 100 in order to provide aircraft power during various flight modes, e.g., during hover, during high-speed cruise, and during long range cruise or long endurance flight in accordance with embodiments of the invention. In FIG. 3A, tail-sitter aircraft 100 is shown with a dual operation turbine engine configuration 300 that provides 100 percent rated aircraft power during hover flight or during high-power cruise. During hover or high-power cruise, turbine engines 110 and 112 are controlled by aircraft computer 202 (FIG. 2) in order to provide full rated total aircraft power. Additionally, gearbox 122 between large turbine engine 112 and gearbox 120 are controlled to provide equal power and thrust to each rotor 106 and 108. In an example, large turbine engine 112 is rated to provide approximately 80 percent of total aircraft power to aircraft 100, and can be controlled to operate during hover and high-speed cruise in order to provide approximately 50 percent of aircraft power directly to rotor 106. Additional rated power (i.e., approximately 30 percent rated power) from large turbine engine 112 is distributed to rotor 108 through cross-shaft 118 in order to supplement the power that is delivered by small engine 110. In an example, small engine 110 is rated to provide approximately 20 percent of total aircraft power to aircraft 100, and is controlled to operate during hover and high-speed cruise in order to provide approximately 20 percent of total aircraft power directly to rotor 108 to supplement the power received from large turbine engine 112.

Figure 3B:
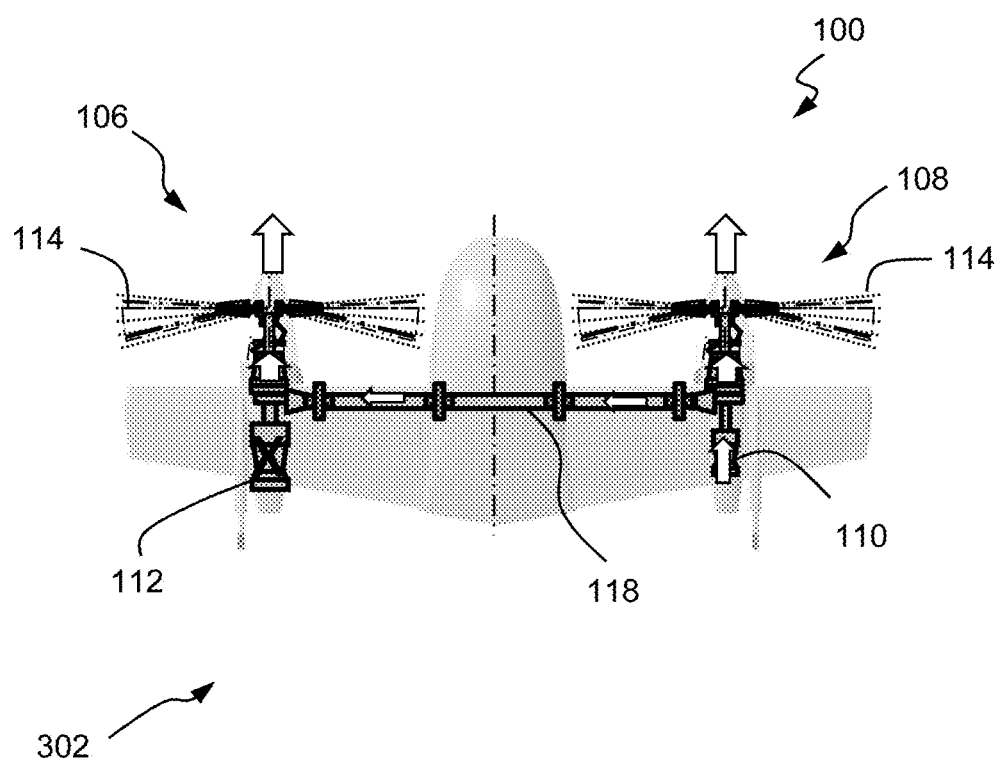
FIG. 3B is a partial elevation view an aircraft that is shown during long-range cruise operating mode in accordance with an embodiment of the invention.

In FIG. 3B, tail-sitter aircraft 100 is shown with a single-operation turbine engine configuration 302 that provides reduced aircraft power for endurance flight or long endurance cruise. During long endurance cruise, turbine engine 112 is shut-down by aircraft computer 202 (FIG. 2) while small engine 110 is operated to provide lower and equal power and thrust to each rotor 106 and 108. In an example, large turbine engine 112 is shut-down. In an example, small turbine engine 110 is rated to provide approximately 20 percent of total aircraft power to aircraft 100. Small turbine engine 110 can be controlled to operate during long endurance cruise in order to provide approximately 10 percent of aircraft power directly to rotor 106. Additional rated power (i.e., approximately 10 percent rated power) from small turbine engine 112 is distributed to rotor 106 through cross-shaft 118 in order to provide equal power (approximately 10 percent) and thrust to rotor 106.

Benefits of single operation turbine engine configuration 302 includes providing full rated power for desirable endurance in mission operations over conventional VTOL tail sitter aircraft that do not utilize single-engine operation. Additional benefits include a large turbine engine and small-engine VTOL configuration can include providing aircraft power required for take-off, hover, and high-power cruise speeds, and reduced fuel consumption during long endurance cruise by operating the turbine engines in a single engine configuration.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system for controlling a tail-sitter aircraft, comprising
a fuselage having a plurality of rotors;
a first turbine engine associated with a first rotor of the plurality of rotors;
a second turbine engine associated with a second rotor of the plurality of rotors, wherein said first turbine engine is larger than said second turbine engine;
a processor; and
memory having instructions stored thereon that, when executed by the processor, cause the system to:
determine a mode of operation for the aircraft;
operate each of the first turbine engine and the second turbine engine to provide total aircraft power during hover or high-power mode of operation; and
selectively provide power from the second turbine engine to the plurality of rotors during a long-endurance cruise mode of operation.

2. The system of claim 1, further comprising a cross-shaft that mechanically connects a first gearbox of the first rotor to a second gearbox of the second rotor.

3. The system of claim 2, wherein the first turbine engine is configured to deliver aircraft power to the second gearbox during the hover or the high-power mode of operation.

4. The system of claim 2, wherein the second turbine engine is configured to deliver aircraft power to the first gearbox during the long-endurance cruise mode of operation.

5. The system of claim 1, wherein the processor is configured to shut down the first turbine engine during the long-endurance cruise mode of operation.

6. The system of claim 1, further comprising a plurality of rotor blades coupled to the plurality of rotors.

7. The system of claim 1, wherein the processor is configured to provide reduced aircraft power to each of the plurality of rotors in the long-endurance cruise mode of operation.

8. A method for controlling a tail-sitter aircraft, comprising
   determining, with a processor, a mode of operation for the aircraft;
   operating, with the processor, each of a first turbine engine and a second turbine engine to provide total aircraft power during hover or high-power mode of operation, wherein said first turbine engine is larger than said second turbine engine; and
   selectively providing, with the processor, aircraft power from the second turbine engine to a plurality of rotors during a long-endurance cruise mode of operation.

9. The method of claim 8, further comprising mechanically connecting a cross-shaft to each of a first gearbox of a first rotor and a second gearbox of a second rotor, the first and second rotors being associated with the plurality of rotors.

10. The method of claim 9, further comprising delivering aircraft power from the first turbine engine to the second gearbox during the hover or the high-power mode of operation.

11. The method of claim 9, further comprising delivering aircraft power from the second turbine engine to the first gearbox during the long-endurance cruise mode of operation.

12. The method of claim 8, wherein the processor is configured to shut down the first turbine engine during the long-endurance cruise mode of operation.

13. The method of claim 8, further comprising coupling a plurality of rotor blades to the plurality of rotors.

14. The method of claim 8, wherein the processor is configured to provide reduced aircraft power to each of the plurality of rotors in the long-endurance cruise mode of operation.

* * * * *